United States Patent [19]

Ionescu

[11] Patent Number: 4,483,435

[45] Date of Patent: Nov. 20, 1984

[54] BOTTLE CONVEYING AND CLEANING APPARATUS

[75] Inventor: Alexandru D. Ionescu, Fairfield, Conn.

[73] Assignee: New England Machinery, Inc., New Haven, Conn.

[21] Appl. No.: 84,009

[22] Filed: Oct. 11, 1979

Related U.S. Application Data

[62] Division of Ser. No. 871,940, Jan. 24, 1978, Pat. No. 4,208,761.

[51] Int. Cl.$^3$ .............. B65G 47/24

[52] U.S. Cl. .............. 198/399

[58] Field of Search .............. 198/399, 400, 416, 624

[56] References Cited

U.S. PATENT DOCUMENTS

| | | | |
|---|---|---|---|
| 3,100,562 | 8/1963 | Whelan | 198/416 |
| 3,868,012 | 2/1975 | Kinsley | 198/399 |

FOREIGN PATENT DOCUMENTS

| | | | |
|---|---|---|---|
| 1283151 | 11/1968 | Fed. Rep. of Germany | 198/416 |
| 2414537 | 10/1974 | Fed. Rep. of Germany | 198/399 |

*Primary Examiner*—Joseph E. Valenza
*Attorney, Agent, or Firm*—Jack Posin

[57] ABSTRACT

A bottle conveying and cleaning apparatus for handling a succession of bottles at high speed. The apparatus comprises a lower portion of a vertical first rotary conveyor which receives the bottles in open-end trailing disposition, reorienting means which changes the disposition of each bottle to open-end radially outward during its conveyance by the first rotary conveyor, a linear conveyor which grasps each bottle at the bottom of the first rotary conveyor while its open end is downward and maintains each bottle in open-end downward orientation while coveying it past cleaning means associated with the linear conveyor, and means for inverting each bottle, removing it from the linear conveyor and placing it on an output conveyor with the open end up. In a preferred embodiment, an upstream portion of the first rotary conveyor also serves as part of a discriminating means for orienting bottles arriving in random orientation to a uniform open-end trailing orientation, guide means are provided for supplying the bottles to the discriminating means in timed sequence, and the bottles are maintained in timed sequence at least until they leave the linear conveyor.

4 Claims, 8 Drawing Figures

BOTTLE CONVEYING AND CLEANING APPARATUS

This is a division, of application Ser. No. 871,940, filed Jan. 24, 1978 now U.S. Pat. No. 4,208,761, which issued on June 24, 1980.

BACKGROUND OF THE INVENTION

The present invention relates to a bottle conveying and cleaning system, and more particularly to a system for receiving bottles having an open end and a closed end in open-end trailing disposition, reorienting them, cleaning in the open-end downward disposition and then placing them onto an output conveyor in open-end up disposition.

Pharmaceutical companies, cosmetic manufacturers and others sell millions of bottles filled with various products yearly. These bottles often must be cleaned before being filled to remove foreign matter from interiors and prevent contamination of the product. It is desirable to perform the cleaning operation with the open end of the bottles facing downward, so that gravity will help remove foreign matter from the interiors. It is usually essential to perform the filling operation with the open ends of the bottles facing up so that the product will be retained by gravity in the bottle until the open end is capped.

The bottles usually are received from the bottle manufacturing operation in completely random orientation. My prior copending U.S. patent application, Ser. No. 763,906, filed Jan. 31, 1977, assigned to New England Machinery Inc., the assignee hereof, discloses means for taking these randomly arranged bottles and orienting them into uniform, open-end trailing disposition in a rotary conveyor and is incorporated by reference herein. My prior copending U.S. patent application, Ser. No. 819,601, filed July 27, 1977 and also assigned to New England Machinery Inc., which is also incorporated by reference herein, discloses means for removing bottles disposed in open-end trailing disposition from a vertical rotary conveyor and placing them in stable, open-end up disposition onto a linear output conveyor. Said U.S. application Ser. No. 819,601, has now matured into U.S. Pat. No. 4,148,390, dated Apr. 10, 1979.

It is an object of the present invention to provide an apparatus which will quickly and reliably take bottles in open-end trailing disposition on a rotary conveyor, reorient them to open-end downward disposition and place them on a linear conveyor in open end downward disposition for cleaning.

It is a further object of this invention to provide means for cleaning each bottle while it is being carried on the linear conveyor with its open end down and to provide means for removing each bottle from the linear conveyor, inverting it, and placing it onto an output conveyor with its open end up.

It is yet another object of this invention to accomplish the inversion of each bottle after cleaning and its placement onto the output conveyor by reorienting each bottle from its open end downward disposition at least partially into an open-end horizontally trailing disposition as it nears the downstream end of the linear conveyor after cleaning, then placing it into a second vertical rotary conveyor in open-end trailing disposition, and removing it from the second vertical rotary conveyor when it has attained a generally open-end up disposition by rotation with the second rotary conveyor.

It is still a further object of this invention to have the upstream portion of the first vertical rotary conveyor serve as part of a bottle discriminating means for receiving a succession of bottles in random open-end leading bottles to an open-end trailing disposition. This use of the first vertical rotary conveyor avoids the need for a complete, separate, discriminating apparatus. In this connection, it should be noted that guide means for supplying the succession of bottles in timed sequence are normally associated with such discriminating means. It is a further object of the invention to maintain the bottles in timed sequence at least until they are discharged from the linear conveyor to facilitate the various reorientation and handling steps. It is yet another object to carry each bottle through the apparatus, at least to the downstream end of the linear conveyor, in continuous motion. This use of a continuous motion avoids the limitations on the speed of the apparatus which would be inherent in repeatedly stopping and starting the motion of each bottle.

Discriminating apparatus of the type set forth in my prior U.S. patent application, Ser. No. 763,906 commonly employs an lever with a integral, selective bottle engaging arm. The lever is pivotally mounted and biased so that the engaging arm is urged in the upstream direction, against the flow of a succession of bottles being moved past it by mobile gripping means. The lever engages only those bottles with open-end leading orientation, and, in cooperation with the gripping means, turns such bottles towards an open-end trailing orientation. It is another object of this invention to provide improved means for biasing the lever of the discriminating apparatus.

BRIEF DESCRIPTION OF THE DRAWINGS

While the specification concludes with claims which particularly point out and distinctly claim the subject matter regarded as the invention herein, it is believed that the invention will be better understood from the following description thereof taken in conjunction with the accompanying drawings, in which:

DETAILED DESCRIPTION OF THE INVENTION

Figure 1:
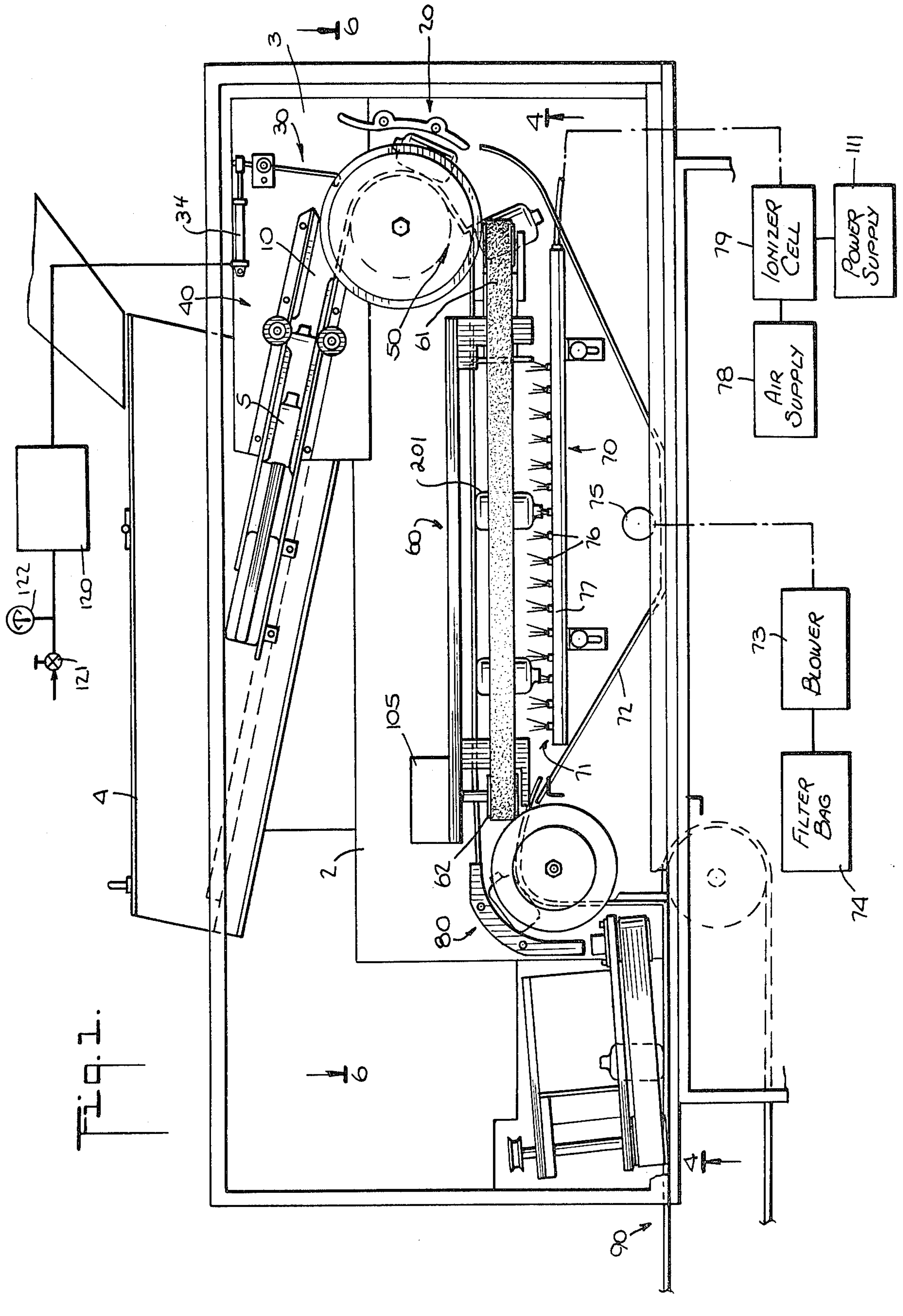
FIG. 1 is a schematic elevational view of an apparatus which represents one embodiment of the present invention.

Referring now to the drawings, wherein like numbers are used to denote like parts in the various views, and particularly to FIG. 1, the overall arrangement of a bottle conveying and cleaning apparatus in accordance with one embodiment of the present invention is illustrated.

It should be understood that, as used in this specification, the term "vertical rotary conveyor" refers to a rotary conveyor wherein the rotationally mobile element rotates in a generally vertical plane, about a generally horizontal axis.

The components of the apparatus are arranged on a generally vertical frame 2. In FIG. 1, a bottle-containing or supply unit 4 is shown at the top. Supply unit 4 feeds bottles in random open-end leading and open-end trailing disposition to guide means, indicated generally by reference numeral 40 and including chute 10, which in turn feeds them to discriminating means 30. Discriminating means 30 inverts those bottles which are in open-end leading disposition to open-end trailing disposition, and feeds a succession of bottles in uniform open-end trailing disposition to the lower portion of first vertical rotary conveyor 20. Although, in the embodiment shown, the upper portion of first vertical rotary conveyor 20 serves as part of discriminating means 30, it should be appreciated that other means could be used to supply a succession of bottles in open-end trailing disposition to the lower portion of rotary conveyor 20. The manner of operation of guide means 40 and discriminating means 30 will be described below.

Means for reorienting each of the bottles during its conveyance by rotary conveyor 20 are indicated generally by reference numeral 50 in FIG. 1. These reorienting means alter the disposition of each bottle so that it is in open-end radially outward disposition, and its open end will face downward when it is at the bottom of first vertical rotary conveyor 20. Linear conveyor 60 has an upstream end 61 positioned beneath rotary conveyor 20, and is constructed and arranged to grasp each of the bottles at the bottom of rotary conveyor 20 and carry such bottle away while maintaining the open-end down orientation of the bottle.

Cleaning means, indicated generally by reference character 70, serve to remove foreign material from the bottles during their carriage by linear conveyor 60. Removal means, indicated generally by reference numeral 80, serve to remove each of the bottles from linear conveyor 60 at its downstream end 62, invert each bottle and place it onto output conveyor 90 in an open-end up orientation.

Figures 2, 5:
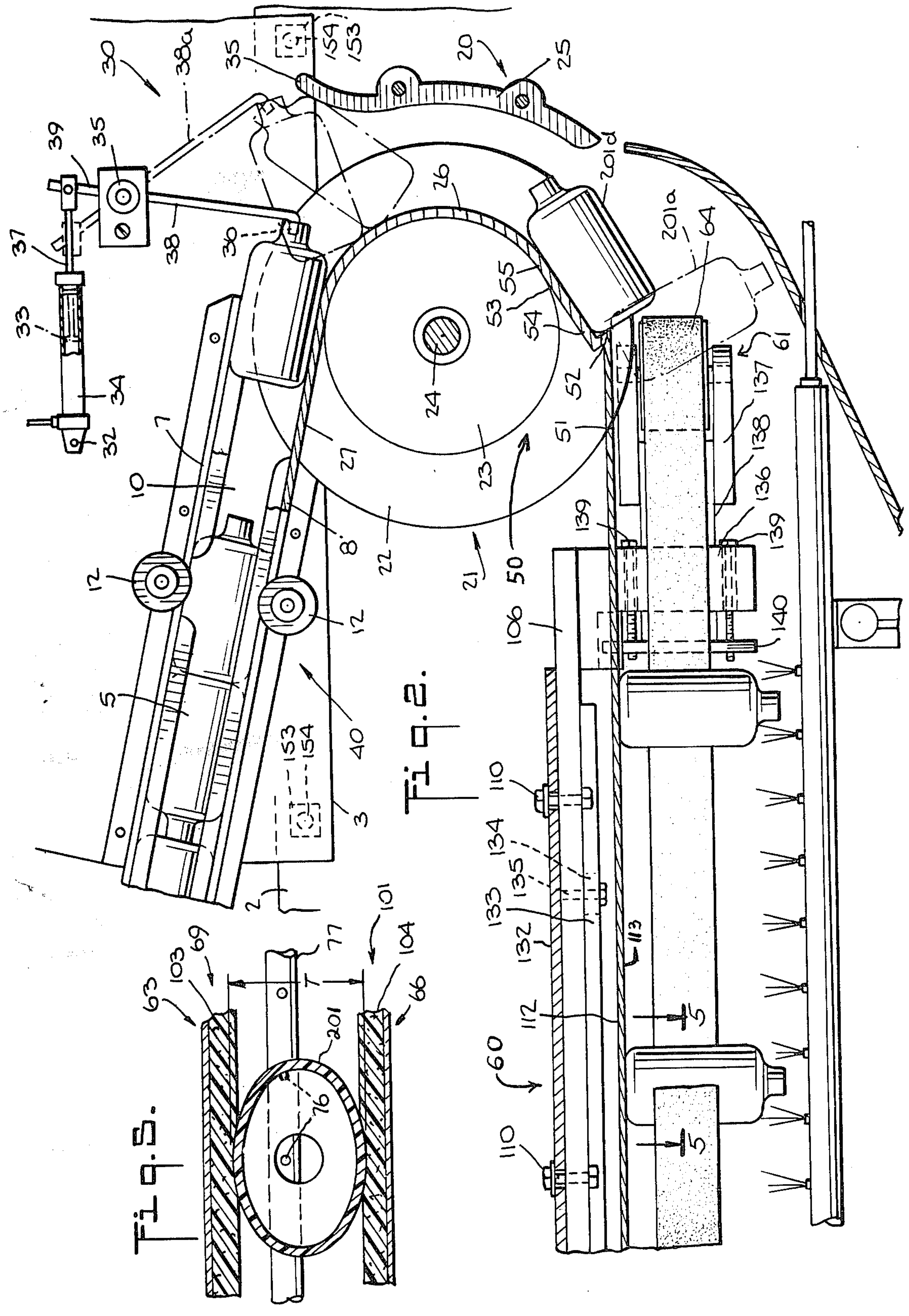
FIG. 2 is an enlarged fragmentary elevational view of a portion of the apparatus shown in FIG. 1, showing the first vertical rotary conveyor and associated elements in detail.
FIG. 5 is an enlarged, fragmentary sectional view taken along the plane indicated at line 5—5 in FIG. 2.

Each of the components described above will now be set forth in greater detail. In the description, the term "thickness" will be used with respect to each bottle to be processed. As used in this description, the term "thickness" should be understood to mean the minimum dimension of each bottle transverse to the axis connecting the open and closed ends of the bottle. FIG. 5 shows the thickness T of a bottle 201 grasped between confronting runs 69 and 101 of belts 63 and 66.

Supply unit 4, as shown in FIG. 1, may be, for example, a conventional tank-like device for containing a large number of plastic bottles randomly predisposed therein, for example, by hand. The unit 4 is equipped with appropriate conventional mechanism (not shown) for discharging the bottles in succession, one-by-one, through an opening 4a and into a chute or conduit 5. The unit 4 may be, for example, of the type which utilizes a rotating cone or plate (not shown) to discharge the bottles in succession, under slight pressure, into the chute 5. A typical version of the unit 4 is, for example, sold under the registered trademark CENTRIFEED by the firm Tangen Drives, Inc. of Clearwater, Fla.

Refer now to FIG. 2 for a detailed view of guide means 40. Communicating with the chute 5 of the unit 4 is a chute or conduit 10 defined by an elongate upper plate member 7 and an elongate lower plate member 8. The members 7 and 8 are secured to one side face of plate 3 which in turn is mounted to frame 2 by bolts 154 and standoffs 153. Members 7 and 8 are spaced from one another such that the conduit 10 defined therebetween has substantially the same dimensions as the chute or conduit 5 with which the unit 4 directly communicates. The conduits 5 and 10 are, thus, substantially identical, and are adapted to guide the advancement of bottles discharged from the unit 4 endwise, in succession, in atrandom open-end leading and open-end trailing dispositions. The elongate members 7 and 8 may be provided with appropriate flanges or lips which prevent inadvertent lateral displacement of the advancing bottles discharged from the unit 4.

Associated with the conduit or chute 10 is a pair of timing rollers, each roller of which is denoted by the reference character 12. The bottom one of the pair is driven in the clockwise direction as shown in FIG. 2 by drive means such as an associated pulley (165 in FIG. 6). The assembly of the timing rollers 12 and the chute 10 constitutes the guide means, shown generally at 40, for receiving and advancing the bottles discharged from the conduit 5. The timing rollers 12 function to control the rate of advancement of the bottles outwardly of the conduit 5 and into the discriminating means, shown generally at 30, for distinguishing bottles of open-end leading disposition from bottles of open-end trailing disposition and altering the disposition of each of the open-end leading disposition bottles to respective open-end trailing disposition bottles as the bottles move through the discriminating means.

As shown, discriminating means 30 includes the top portion of first vertical rotary conveyor 20. Rotary conveyor 20 includes rotationally mobile gripping means or mobile element 21 which is capable of frictionally engaging opposite sides of a bottle over areas of contact between the bottle and the gripping means. In FIG. 2 (and FIG. 4), the gripping means 21 is shown as a pair of radially extending resilient discs 22 which are coaxially mounted and spaced apart by a distance which is slightly less than the thickness of one bottle by spacer 23. Gripping means 21 is mounted to shaft 24, which in turn is rotatably mounted to frame 2. Drive means (such as pulley 166 shown in FIG. 6) are provided for rotating gripping means 21 in the clockwise direction as viewed in FIG. 2.

A stationary central guide 26 is located between discs 22. The generally arcuate outer surface of central guide 26 cooperates with discs 22 to define a generally U-shaped channel around a portion of the periphery of mobile element 21. As shown in FIG. 2, central guide 26 is formed integrally with lead-in ramp 27, which extends to lower plate member 8 of chute 10.

Timing rollers 12, which are rotatably mounted to plate 3, rotate in opposite directions so as to cooperate with one another and frictionally advance bottles at a prescribed rate to the discs 22 of first rotary conveyor 20. The discs 22, on the other hand, rotate in unison with one another in a clockwise direction at a tangential speed greater than the prescribed rate of advancement of bottles through rollers 12 and are adapted to initially frictionally grip and accelerate the leading end portion (and subsequently, the remainder) of each bottle advanced thereto by the timing rollers 12. As such, the clockwise rotation of the discs 22 effects movement of each bottle gripped thereby toward a lever 38 pivotally connected at one end portion 39 to the plate 3 and lightly biased in a clockwise direction to rest against a stop (not shown) in the position illustrated in FIG. 1. The opposite end of the lever 38 is generally hook-shaped to form a bottle engaging arm 36 which is interposed in spaced relation between the discs 22 at an appropriate location for being engaged by the leading end of each bottle advanced thereto by the discs 22.

The drive means associated with the timing rollers 12 and mobile element 21 and including pulleys 165 and 166 (FIG. 6), may, for example, be of the type disclosed in said copending U.S. patent application Ser. No. 763,906.

In a manner as disclosed in the aforementioned U.S. patent application, the discs 22 of mobile element 21 advance each bottle in succession to the lever 38. If the bottle advanced to the lever 38 has a closed end leading disposition, such closed end of the bottle contacts the bottle engaging arm 36 of the lever 38 causing it to pivot generally counterclockwise to a position out of operative association with such bottle, and the bottle passes through the discriminating means 30 without inverting. If, on the other hand, the bottle advanced to the lever 38 has an open-end leading disposition, as shown in FIG. 2, the bottle engaging arm 36 of the lever 38 will act to grip the open end of such bottle, and will pivot counterclockwise to the position shown at 38*a* in FIG. 2 as the remainder of the bottle gripped by the discs 22 is advanced in a generally clockwise direction. However, since engaging arm 36 of the lever 38 is engaged with the open end of the bottle, the bottle will start to invert or pivot relative to the discs 22 in a generally counterclockwise direction until the trailing closed end thereof moves in advance of engaging arm 36. This eventually allows the open end of the bottle which initially engaged arm 36 to be disengaged from arm 36. This occurs when arm 36 clears the lip of the bottle with which it is engaged allowing the bias means associated with lever 38 to return the lever to its starting position. During the foregoing operation, the continued clockwise rotation of the discs 22 also causes the open end portion of the partially inverted bottle to contact cam 35 and be cammed toward discs 22, completing the inversion of the bottle.

In this manner, those bottles having a closed end leading disposition remain unaltered by the lever 38, whereas those bottles having an open end leading disposition are effectively inverted by the cooperation of the lever 38 and cam 35 with the discs 22. Such inversion on a selective basis of those bottles having an open end leading disposition results in the formation of a train of bottles each having uniform open-end trailing disposition downstream of lever 38 and cam 35, entering the lower portion of rotary conveyor 20.

It should be noted that the cooperation of timing rollers 12 with mobile element 21 has placed the bottles into timed sequence. As used in this disclosure, the term "timed sequence" means a sequence of objects moving through a conveying mechanism with the downstream advancement of each object controlled by the conveying mechanism, rather than by contact with an adjacent object. Although the action of discriminating mechanism 30 may retard those bottles which entered with open-end leading dispositions (because bottles which are inverted have their centers of gravity moved backwards along the periphery of the discs 22 and take longer to move through the arc extending from chute 10 to conveyor 60), it does not destroy the timed sequence. As will be apparent from the discussion of the remaining components, the timed sequence is maintained at least until the bottles traverse linear conveyor 60, and each bottle is carried in a continuous motion from guide means 40 to the downstream end 62 of linear conveyor 60.

The biasing means for lever 38 shown in FIG. 2 form a part of the present invention. Spring means were described in my prior copending application Ser. No. 763,906 for biasing the lever. Although such spring means are effective, I have found that difficulties such as changes in spring force with the displacement of lever 38 can be overcome by the use of gas-spring means as shown in FIG. 2.

As described above, the upper portion of lever 38 is pivotally supported in bearing 35 which is mounted to plate 3 and positioned above the path of movement of the bottles engaged by discs 22 of gripping means 21. A container having variable volume, shown here as hollow cylinder 34 and piston 33 in slidable sealing engagement with the interior walls of cylinder 34, has one end pivotally mounted to plate 3 in fixed location relative to bearing 35, in this case by pin 32. The other end, in this case piston 33, is linked to lever 38 so that expansion of the volume of the container, as by movement of piston 33 towards the right in FIG. 2, will tend to pivot lever 38 about bearing 35 and bias engaging arm 36 upstream relative to the direction of movement of the bottles. Piston 33 is linked to lever 38 by piston rod 37, which is fixed to piston 33 at one end and pivotally mounted to lever 38 at the other end.

Means for filling cylinder 34 with a compressed gas is preferably provided as shown in FIG. 1, and includes a reservoir 120 of greater internal volume than cylinder 34 in communication with cylinder 34 and a means for supplying a gas at predetermined pressure to the reservoir, shown in FIG. 1 as regulator 121 and gauge 122. Reservoir 120 serves as a buffer to minimize changes in the gas pressure which would otherwise be caused by changes in the volume contained by piston 33 and cylinder 34 with movement of lever 38.

As described above, discriminating means 30 feeds a succession of bottles in uniform open-end trailing disposition to the lower portion of conveyor 20. A peripheral guide 25, which may be integral with cam 35 of the discriminating means 30 as shown in FIG. 2, accurately positions the bottles between discs 22 as they are carried through a generally arcuate path in the lower portion of rotary conveyor 20 with the rotation of discs 22 to the reorienting means.

Figures 3, 4:
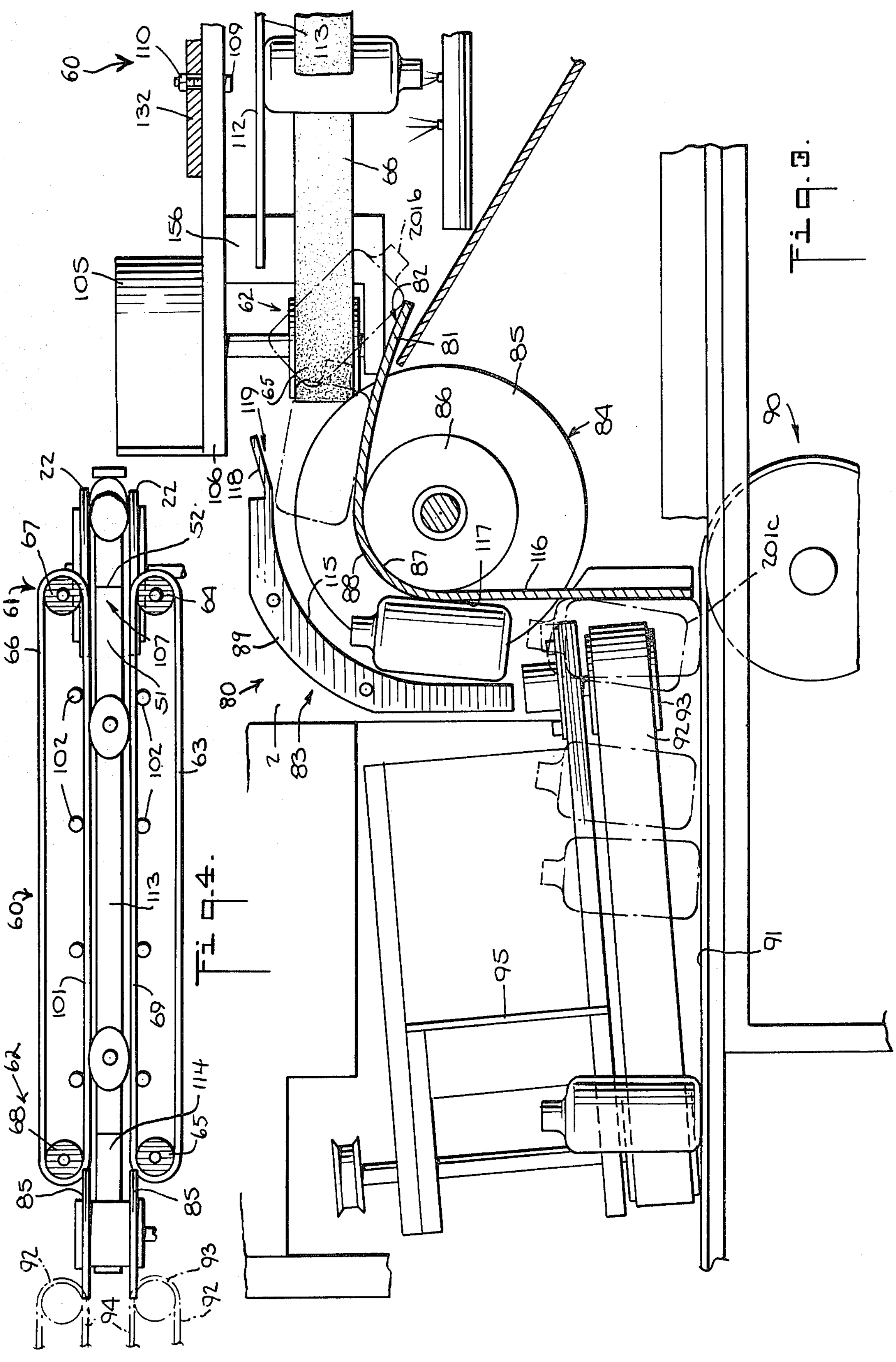
FIG. 3 is an enlarged fragmentary elevation view of another portion of the apparatus shown in FIG. 1, showing the second vertical rotary conveyor and associated elements to detail.
FIG. 4 is a partial sectional view of the apparatus shown in FIG. 1, taken along the plane indicated at line 4—4 in FIG. 1.

As the bottles are carried by conveyor 20, they encounter reorienting means 50, shown in FIGS. 2 and 4 as stationary pivot member 51 which has an upstream end 52 positioned in the path described by each bottle as it travels in engagement with gripping means 21. In the embodiment shown, it is essential that the upstream end 52 of pivot member 51 be positioned radially inwardly (with respect to the axis of rotation of gripping means 21) of the path described by the centers of the areas of contact between the bottles and the gripping means. In this construction, the upstream end 52 of pivot member 51 will engage the radially inward portion of the leading surface of each bottle. With continued rotation of the gripping means, the portion of the bottle at the center of the area of contact with the gripping means will continue to move downstream with gripping means 21. Because the travel of the radially inward portion of the leading surface of the bottle has been arrested by engagement with the pivot member, the bottle must pivot around the upstream end of the pivot member and its disposition will be altered. In the conveying and cleaning apparatus as shown in the drawings, the leading surface of each bottle is the closed end, and each bottle is reoriented to a disposition in which its open end is radially outward with respect to rotary conveyor 20.

Preferably, a stationary cam 53 is positioned between discs 22 upstream of pivot member 51. This cam has its downstream end 54 radially outward of its upstream end 55, and serves to maintain the position of each bottle as it approaches pivot member 51. With bottles having convex sides (see FIG. 5), the centers of the areas of contact between each bottle and the gripping means lie along the centerline of the bottle. The bottle shown in FIG. 2 and denoted by reference character 201*d* is in the preferred position as it approaches pivot member 51. Note that the centerline of bottle 201*d*, and thus the centerline of the areas of contact between bottle 201*d* and discs 22, lie along a chord of discs 22 which passes radially outwardly of upstream end 52 of pivot member 51. If cam 53 were absent, each bottle might accidently rotate with respect to discs 22 before reaching pivot member 51 to a position where its centerline, and thus the centerline of the areas of contact, would pass radially inwardly of upstream end 52 of pivot member 51. If that occurred, the bottle would not pivot about pivot member 51.

In other possible embodiments, arcuate guide member 26 may be of such small radius that each bottle would be too close to the center of discs 22. It should be apparent that cam 53 would move such bottles radially outwardly, toward the periphery of discs 22.

Figure 6:
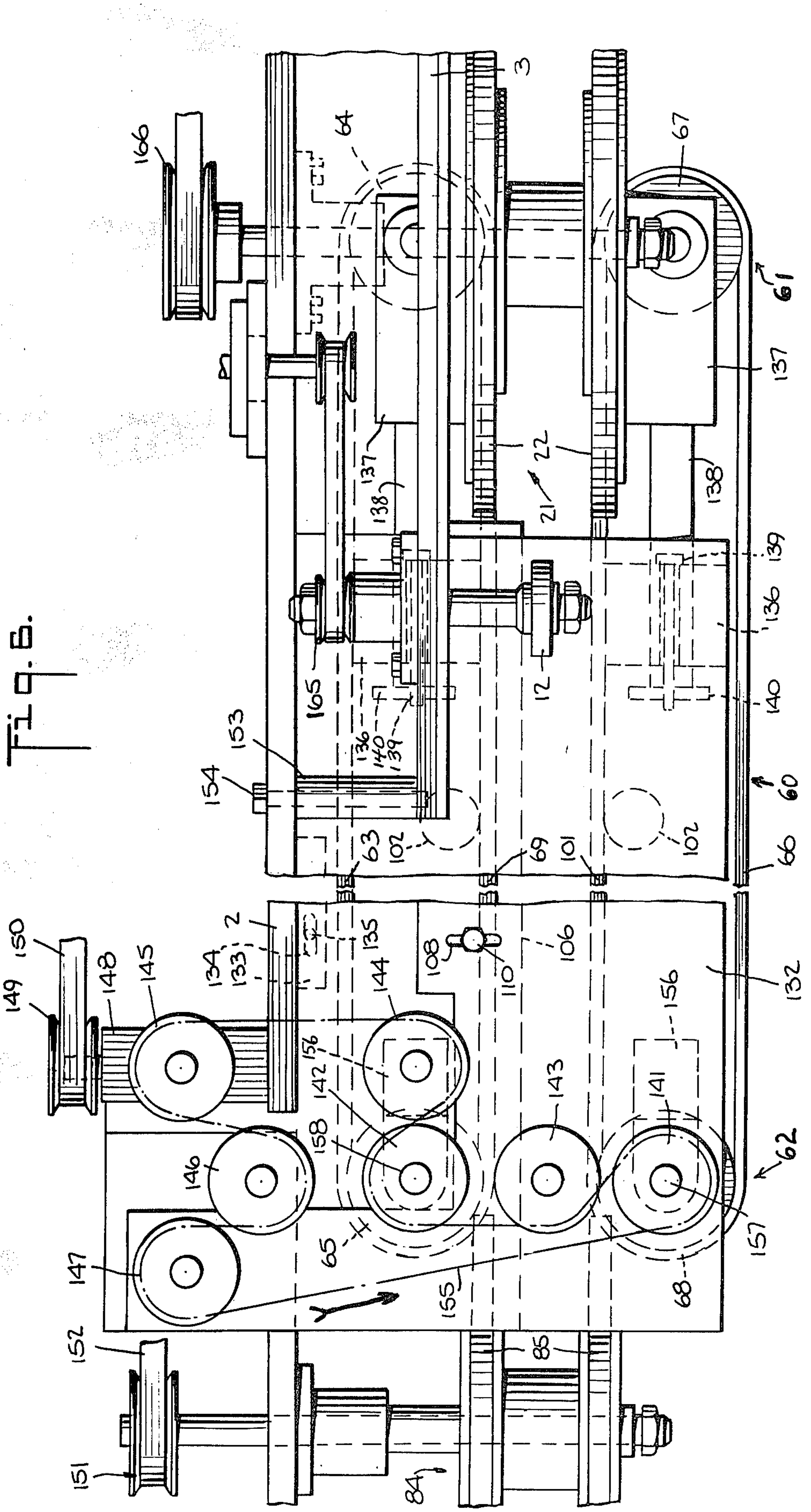
FIG. 6 is an enlarged partial sectional view of the apparatus shown in FIG. 1 taken along the plane indicated at line 6—6 in FIG. 1.

Linear conveyor 60 is shown in overall plan view in FIGS. 4 and 6. The details of its upstream end 61 are shown in FIG. 2, and the details of its downstream end 62 are shown in FIG. 3. As shown in FIGS. 2, 3 and 6, conveyor frame 106 is mounted to frame 2 by underlying support member 133. Bolts 135 extend through slots 134 in support member 133 to engage threaded holes in conveyor frame 106. By loosening bolts 135, the entire linear conveyor may be moved towards or away from the mobile gripping means 21 of first vertical rotary conveyor 20.

A pair of pulleys consisting of upstream pulley 64 and downstream pulley 65 are rotatably mounted to conveyor frame 106 and are operatively associated with first endless belt 63. Upstream pulley 64 (FIG. 2) is mounted to conveyor frame 106 by means of pulley support 137, which is fastened to slide 138. Slide 138 is movable from left to right as shown in FIG. 6 (and FIG. 2) with respect to vertical support 136, which in turn is fixed to conveyor frame 106. Bolts 139 extend through clearance holes in vertical support 136 to engage threaded holes in end plate 140, which is fixed to slide 138. Bolts 139 may be tightened to force plate 140, slide 138, pulley support 137 and upstream pulley 64 to the right, so that belt 63 will be maintained in taut relation. Because the tension of belt 63 may impose considerable loading on downstream pulley 65, its bottom end, remote from conveyor frame 106, is preferably supported by a bracket 156.

Outboard belt frame 132 partially overlies conveyor frame 106, and is fastened to it by bolts 110 extending through slots 108 in outboard belt frame 132. A pair of pulleys consisting of upstream pulley 67 and downstream pulley 68 (FIG. 6) are rotatably mounted to outboard conveyor frame 132 in the same way that pulleys 64 and 65 are mounted to conveyor frame 106. Pulleys 67 and 68 are operatively associated with a second endless belt 66 and maintain it in taut relation. Because all of the aforementioned pulleys are substantially coplanar and rotatable about vertical axes, they position belts 63 and 66 so that run 69 of belt 63 confronts run 101 of belt 66. By loosening bolts 110, outboard belt frame 132 may be adjusted toward or away from conveyor frame 106 until confronting runs 69 and 101 are horizontally spaced by a distance which is slightly less than the thickness of one bottle. Preferably, rollers 102 (FIGS. 4 and 6) are mounted to conveyor frame 106 and outboard belt frame 132 to maintain the spacing of confronting runs 69 and 101 at points between the upstream and downstream pulleys.

In the preferred embodiment, endless belts 63 and 66 are provided with resilient outer surfaces 103 and 104 (FIG. 5) respectively to improve the engagement between the confronting belt runs and the bottles and to accommodate variations in thickness among the bottles to be processed.

Drive means, shown in FIG. 1 enclosed by cover 105, is shown in detail in FIG. 6 with cover 105 removed. Belt 150, which is preferably connected to the drive means of rotary conveyor 20 by intermediate belts and shafts (not shown), powers right-angle drive 148 through pulley 149, rotatable in a generally vertical plane. Right-angle drive 148 is mounted to frame 2 and powers drive sprocket 145. Drive sprocket 145 in turn pulls belt 155, which is preferably a flexible, toothed timing belt, around pulleys 146, 147, 141, 143, 142, and 144 in that order in the direction shown by the arrow adjacent to belt 155. Pulley 141 is fixed to shaft 157, as is downstream pulley 68 associated with belt 66, so that pulley 68 rotates with pulley 141. Similarly, pulley 65 of belt 63 is mounted for rotation with pulley 142 on shaft 158. Thus, the motion of belt 155 drives endless belts 63 and 66 so that confronting runs 101 and 69 move in the downstream direction (from right to left in FIG. 6).

It should be noted that idler pulleys 144 and 146 and pulley 142, described above are rotatably mounted to conveyor support 106, while idler pulleys 147 and 143, and pulley 141, described above, are rotatably mounted to outboard belt frame 132. As described above, outboard belt frame 132 may be adjusted towards or away from conveyor frame 106 to adjust the spacing of confronting runs 101 and 69 of belts 66 and 63. Although the pulleys 147, 143 and 141 are moved relative to pulleys 146, 142, 144, and 145 by this adjustment, the tension of belt 155 is not affected. As outboard belt frame 132 is moved away from conveyor frame 106, pulley 143 moves away from pulley 142, which would tend to tighten belt 155. However, pulley 147 is moved towards pulley 146, which would tend to loosen belt 155 by an equivalent amount.

As shown in FIG. 4, upstream pulleys 64 and 67 of linear conveyor 60 cooperate to define an upstream nip 107 at the entry to confronting runs 69 and 101. Downstream pulleys 65 and 68 cooperate to define a downstream nip 114 at the exit from the confronting runs.

Referring now to FIG. 2, note that the upstream end 52 of pivot member 51 is located near the bottom of rotary conveyor 20, so that upstream end nip 107 of linear conveyor 60 will engage each bottle concomitantly with its rotation about pivot member 51. Belts 63 and 66 must be spaced vertically from discs 22 to avoid interference between the belts and the discs. Thus, if this type of belt conveyor is to be used, it is essential that a portion of each bottle project radially outwardly beyond discs 22 when it has pivoted into its open-end-radially outward orientation after engaging pivot member 51.

As stated above, it is preferred that linear conveyor 60 engage each bottle concomitantly with its pivoting motion about pivot member 51. As can be appreciated, each bottle is only held at its radially inward end after the pivoting motion. Thus, the bottles might be unintentionally dislodged from between discs 22 if they are transported over any great distance by rotary conveyor 20 after pivoting.

In the preferred embodiment shown in FIG. 2, belts 63 and 66 engage each bottle at upstream end nip 107 before it has completed its pivoting motion about pivot member 51. The bottle shown in broken lines and indicated by reference numeral 201*a* in FIG. 2 is just at the point of engagement with the belts. This point of engagement preferably occurs when the longitudinal axis of each bottle is approximately 60° below the horizontal, with each bottle having pivoted from a position in which its longitudinal axis was approximately 35° above the horizontal, as shown in FIG. 2. As can be appreciated, the motion of the confronting runs of the belts, away from rotary conveyor 20 in a direction generally tangential to the bottom of discs 22, will continue to pivot bottle 201*a* about pivot member 51 after engagement of the bottle with the belts until the longitudinal axis of the bottle assumes a substantially vertical position. To control the exact point of engagement of the bottles with the belts, the lateral position of upstream pulleys 63 and 67 may be horizontally adjusted with respect to the vertical centerline of rotary conveyor 20 by adjusting the position of conveyor frame 106 as described above.

Depending on the dimensions of the apparatus and of each bottle, and the exact point of the bottle which is first engaged by belts, the magnitude of the component of velocity in the direction of motion of the belts of the point on the bottle which is first engaged by the belts may be less than or greater than the tangential speed of discs 22. I have found it preferable to match the speed of the belts with the magnitude of this velocity component. In one apparatus constructed according to the present invention, a belt speed of approximately two-thirds of the tangential speed of the outer periphery of the discs was employed successfully.

It should be appreciated that each bottle need not be precisely oriented to an absolutely vertical orientation with its open end down by the pivoting motion about member 51. Considerable deviations from vertical can be tolerated without impeding the efficiency of cleaning means 70, so long as the open end of each bottle faces generally downward while it is being carried by linear conveyor 60.

As shown in FIG. 1, cleaning means 70 comprises nozzle means 71 positioned beneath linear conveyor 60 for injecting a fluid upward into the open ends of bottles 201 as they are carried by linear conveyor 60, and a trough 72 positioned beneath nozzle means 71 for collecting material removed from the bottles. In the preferred embodiment, the fluid injected is air and the cleaning means 70 also includes suction means, shown as blower 73 and filter bag 74 for removing air and entrained foreign material from the trough. The suction means preferably communicates with the trough through a port 75 in a wall of the trough which is located below the nozzle means.

Nozzle means 71 preferably includes a plurality of nozzles 76 in communication with manifold 77, which in turn is in communication with compressed air supply means 78. It is preferable to provide means for ionizing air interposed between supply means 78 and manifold 77 in the path of communication therebetween, so that the air will be able to neutralize any static charges on the bottles and on the foreign matter adhering to them. This neutralization releases foreign matter from the grip of electrostatic forces which would otherwise hold it to the bottles. The ionizing means comprises an ionizer cell 79 powered by power supply 111 which is electrically connected to the cell. Suitable cells are sold by Herbert Products, Inc., of Westbury, N.Y., under the registered trademark of CURASTAT IONCEL, Model SE 1370. Suitable power supplies are sold by Herbert Products under the trademark of CURASTAT POWER-PAK, Model P-8 SE 1501.

The length of linear conveyor 60, the number of nozzles 76 and the spacing of the nozzles are matters of choice. I have found that an array of nozzles extending along a length of linear conveyor 60 which is equal to the distance travelled by belts 63 and 66 in one and one-half to two seconds gave satisfactory results with one group of bottles.

As shown in FIG. 5, it is preferable to place the nozzles 76 along a line offset from the center of the space between confronting runs 69 and 101 of belts 63 and 66 but parallel thereto, to optimize the air flow from each nozzle into the interior of each bottle. It is also preferable to space the nozzles along the line in the upstream to downstream direction of linear conveyor 60 by a distance which is slightly greater than the dimension of the opening in the open end of each bottle. This assures that the opening of each bottle will be removed from the air stream of one nozzle before it enters the air stream of the next nozzle downstream. I have found that the pulsatile flow of air into and out of each bottle created by this upstream-to-downstream spacing is more effective than continuous flow.

The resilient coverings 103 and 104 on the outer surfaces of belts 63 and 66 provide one means of limiting the vertical travel of bottles being carried by linear conveyor 60. However, it is sometimes useful to provide a backup strip 112 (FIG. 2) mounted to frame 2 and positioned above the belts with a face 113 (FIG. 4) of the strip confronting the space between confronting runs 69 and 101 of the belts to prevent the bottles from moving upwardly under the influence of air flowing from the nozzles beneath the belts. In the embodiment shown in FIGS. 1 through 6, the backup strip 112 is formed integrally with pivot member 51 so that its confronting face 113 is continuous with the surface of pivot member 51 which lies radially outwardly with respect to rotary conveyor 20.

FIG. 3 shows the preferred embodiment of removal means 80 (FIG. 1) for removing each bottle from linear conveyor 60, inverting it and placing it onto output conveyor 90 in an open-end up orientation. In the preferred embodiment, turning means, shown here as stationary lower ramp 81, are provided for turning each bottle from its open-end-downward orientation at least partially to an open-end horizontally trailing orientation before it reaches the downstream end of linear conveyor 60. Lower ramp 81 extends beneath belts 63 and 66, generally downstream of cleaning means 70, and defines lower cam surface 82 which inclines upward toward the belts in the downstream direction of conveyor 60. The upstream portion of lower cam surface 82 engages the open, downward-facing end portion of each bottle as it is carried past ramp 81. With continued motion of belts 63 and 66, the open end of each bottle so engaged is retarded in its travel towards the downstream end of conveyor 60 and cammed upward towards the belts so that it lies generally behind the closed end of the bottle. A bottle undergoing this process of reorientation is shown in broken lines and indicated by reference numeral **201*b***.

Preferably, the downstream pulleys 65 and 68 associated with each belt of linear conveyor 60 are positioned adjacent each other so that they cooperate to form a downstream nip 114 at the downstream end of linear conveyor 60 (see FIG. 4). If this arrangement is used, it is preferable to place lower ramp 81 so that the turning motion of each bottle occurs while the bottle is at least partially within the downstream nip. Because each belt is backed by a pulley at the nip 114, the belts have a firmer grasp on each bottle when it is in the nip than when it is at other locations along conveyor 60. Thus, the engagement of each bottle with cam surface 82 will be less likely to dislodge it from between the belts if this preferred embodiment is used.

The preferred removal means also includes a second vertical rotary conveyor 83 which is positioned downstream of linear conveyor 60. Rotary conveyor 83 includes a rotationally mobile grasping means or mobile element 84 mounted to frame 2 and rotatable about a horizontal axis in the direction (counterclockwise in FIG. 3) wherein the portion of element 84 which is at the top will move in the downstream direction of linear conveyor 60. Mobile element 84 is so positioned that the portion at the top confronts the downstream end of linear conveyor 60 to receive and engage each bottle in generally open-end horizontally trailing orientation concomitantly with its disengagement from the belts 63 and 66. As it rotates, mobile element 84 carries each bottle along a generally arcuate path until the trailing open end of the bottle faces generally up.

Preferably, mobile element 84 includes a pair of resilient, radially extending discs 85 mounted coaxially with the axis of rotation of element 84 and axially spaced apart by spacer 86 a distance which is slightly less than the thickness of one bottle. The discs will frictionally engage each bottle on opposite sides of the bottle.

To constrain each bottle between the discs, an inner stationary guide member 87 having a generally arcuate surface 88 facing radially outwardly with respect to the axis of rotation of mobile element 84 and concentric with that axis is positioned between discs 85. An outer stationary guide member 89, having a generally arcuate inward facing surface 115 concentric with surface 88, is mounted to frame 2 so as to be positioned around discs 85, adjacent to their periphery. Surfaces 88 and 115 cooperate to define a generally arcuate path for each bottle to follow in its rotation with discs 85. Preferably, the radial spacing between surfaces 115 and 88 is chosen to provide some clearance between the bottle and the surfaces. As will be apparent, the proper spacing will depend on the dimensions of bottles to be processed.

In the preferred embodiment shown in FIG. 3, discs 85 engage each bottle before it is fully disengaged from the downstream nip 114 of linear conveyor 60, and the tangential speed of the pheripheries of discs 85 is somewhat greater than the speed of belts 63 and 66 of linear conveyor 60.

Preferably, upper ramp 118 is formed integrally with outer guide member 89. Upper ramp 118 defines a downward-sloping upper cam surface 119 which serves to direct each bottle into the space between guide surfaces 115 and 88 and assists in reorienting each bottle to open-end trailing orientation. Note that there is a gap between the downstream end of backup member 112 and the upstream end of upper ramp 118. This gap overlies the point in the travel of each bottle where it engages lower ramp 81, and allows the corner of the closed end of each bottle which was trailing in the open-end downward orientation to swing upwardly during the turning motion of the bottle.

Bottle ejection means are provided for releasing the bottle from the second rotary conveyor 83 after it has been carried through the arcuate path described above. In the embodiment shown in FIG. 3, these ejection means are in the form of an ejection ramp 116 having an ejection cam surface 117 positioned between discs 85. Ejection cam surface 117 extends generally downward and tangential to outward-facing arcuate guide surface 88. As will be apparent, each bottle will be guided radially outwardly from between discs 85 by ejection cam surface 117 and moved generally downwardly by the counterclockwise rotation of discs 85, but its open-end up orientation will be maintained. Once the bottle is free of discs 85, it moves to output conveyor 90 under the influence of the momentum imparted by discs 85.

In the preferred embodiment shown in FIG. 3, ejection cam 116, inner guide member 87 and lower ramp 81 are formed integrally so that ejection cam surface 117, outward-facing guide surface 88 and lower cam surface 82 are all continuous. This integral component is secured to frame 2.

As shown in FIGS. 1 and 3, output conveyor 90, which is not part of the apparatus of the present invention, is a belt conveyor with top run 91 positioned to receive bottles ejected from second vertical rotary conveyor 80 in the manner described above, although any form of output conveyor could be utilized with the apparatus of the present invention. Linearly mobile bottle-gripping means as set forth in my prior copending U.S. patent application Ser. No. 819,601 may be employed to stabilize each bottle in open-end up orientation as it begins its travel with top run 91 of output conveyor 90. As shown in FIGS. 3 and 4, these linearly mobile gripping means comprise a pair of endless gripping belts 92 mounted on associated pulleys 93 which in turn are rotatably mounted to subframe 95. Gripping belts 92 are pitched downwardly in the direction of motion of top run 91 of output conveyor 90. The confronting runs 94 of gripping belts 92 are spaced apart by a distance slightly less than the thickness of one bottle, and driven in the downstream direction of output conveyor run 91. An upstream end nip formed by the confronting runs 94 of the gripping belts is positioned slightly downstream of the point of impact of each bottle on top run 91. As bottles, shown in broken lines and indicated by reference numeral **201*c***, impact on run 91, they tend to rebound away from run 91, with a component of velocity in the downstream direction imparted by their contact with run 91. Thus, each bottle will move into engagement with confronting runs 94 and be carried downstream and downwardly against run 91 of the output conveyor with the motion of confronting runs 94. This action is set forth in greater detail in my prior copending application.

Figure 7:
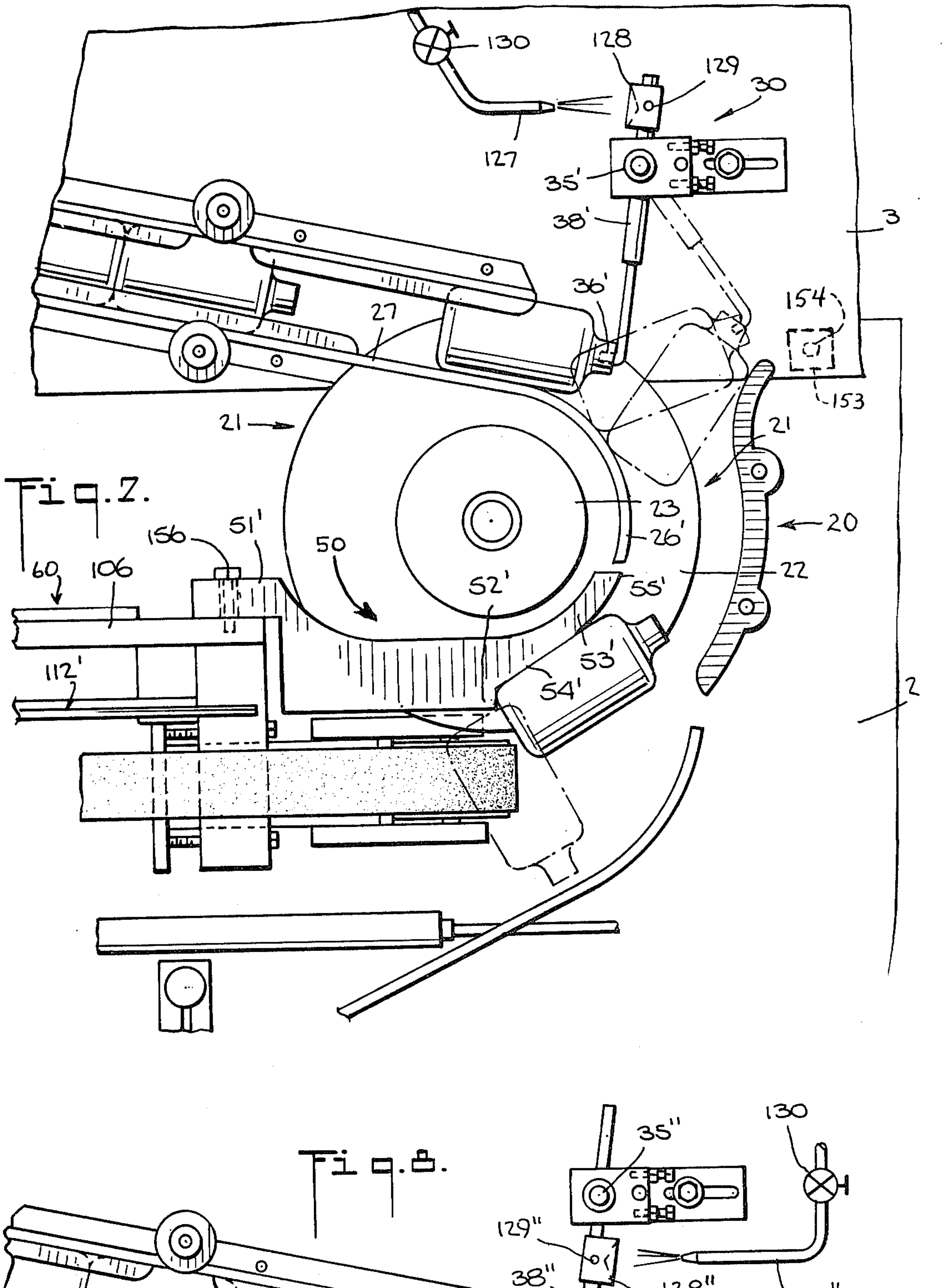
FIG. 7 is a view similar to FIG. 2, showing an alternate embodiment of those components associated with the first vertical rotary conveyor.

FIG. 7 depicts an alternate embodiment of the reorienting means 50 associated with first rotary conveyor 20, and an alternate means for biasing lever 38′ of discriminating means 30.

As shown in FIG. 7, stationary pivot member 51′ is not integral with backup strip 112′ of linear conveyor 60. This arrangement should be contrasted with the arrangement shown in FIG. 2 and described above. In that embodiment, pivot member 51 was formed integrally with backup strip 112.

In the embodiment of FIG. 7, pivot member 51′ is formed as a separate piece which is secured in position by bolts 156 which fasten it to conveyor frame 106. Cam 53′ is formed integrally with pivot member 51′, and has its downstream end 54′ positioned radially outwardly of its upstream end 55′. Thus, cam 53′ functions in the same manner as cam 53 of FIG. 2 to facilitate the pivoting action. Central guide 26′ is not integral with cam 53′.

It will be apparent that this integral assembly of pivot member 51′ and cam 53′ may be readily replaced by simply removing bolts 156. Thus, this embodiment is to be preferred when bottles of different sizes are to be processed in different runs of the apparatus. For example, if a short, narrow type of bottle is to be processed, it would be advantageous to use a cam and pivot member assembly which brings each bottle quite close to the outside of discs 22, and which has the upstream end 52′ of the pivot member only slightly radially outwardly of the downstream end of 54′ of the cam.

If bottles of different sizes are to be processed, it may also be necessary to change discriminating means 30 and guide means 40 to accommodate them. This can be accomplished by simply unbolting plate 3 and removing all of the components mounted to it, then replacing it with a new plate having components appropriate to the new bottle size to be processed.

As shown in FIG. 7, an alternate means of biasing lever 38′ of discriminating apparatus 30 employs a fluid jet. It should be noted that lever 38′ is pivotably mounted to bearing 35′ which in turn is mounted to plate 3 and positioned above the path of bottles advancing with gripping element 21, in an arrangement similar to that of lever 38 of FIG. 2. Lever 38′ has engaging arm 36′ formed integrally with its lower portion, and serves to invert bottles arriving with open-end leading disposition in a manner similar to lever 38 of FIG. 2.

However, the piston and cylinder arrangement shown in FIG. 2 is not used in the biasing means shown in FIG. 7. Instead fluid jet means in the form of nozzle 127 are provided for directing a stream of fluid at a point 129 on lever 38′ above bearing 35′ in a direction generally transverse to lever 38′. The direction of flow is generally downstream with respect to the direction of movement of bottles in that portion of gripping means 21 which is adjacent to lever 38′. Vane 128 is mounted on lever 38′ at point 129, so that the fluid stream impinging on vane 128 will tend to pivot lever 38′ in a generally clockwise direction as shown in FIG. 7 and thus bias engaging arm 36′ in the upstream direction relative to the movement of the bottles.

Figure 8:
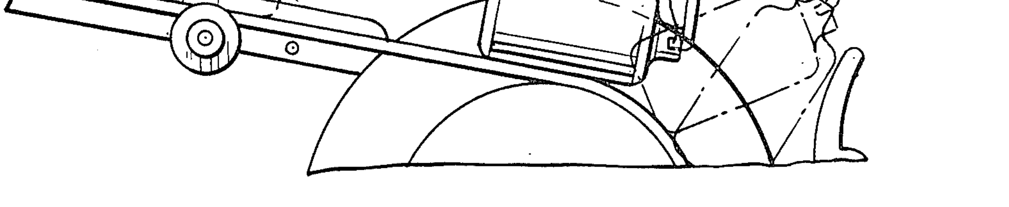
FIG. 8 is a fragmentary view showing a further alternate embodiment of the biasing means of the present invention.

A further embodiment of this fluid jet biasing means is shown in FIG. 8. The apparatus shown in FIG. 8 is identical with that shown in FIG. 7, except that vane 128″ is mounted at a point 129″ of lever 38″ below bearing 35″ but above engaging arm 36″, and nozzle 127″ is mounted to direct a stream of fluid in the upstream direction relative to the movement of the bottles engaged by gripping means 21. As will be apparent, the fluid stream impinging on vane 128″ tends to bias the lever 38″ in the clockwise direction as shown in FIG. 8.

In the embodiments of FIGS. 7 and 8, means such as flow control valve 130 may be provided in the path of communication between nozzle 127 or 127″ and the fluid source (not shown) for selectively controlling the flow rate of the fluid stream and thus selectively controlling the strength of the biasing force applied to the lever.

It should be understood that the foregoing description describes only the preferred embodiments of the present invention, and that many other embodiments are possible without departing from the present invention. For example, the present invention has been described in the preferred position, with reference to vertical, horizontal, up and down directions for clarity and ease of understanding. Because the apparatus does not depend upon gravity for movement of bottles, it would function in any position. Thus, the direction called "down" in the foregoing description can be more generally described as the "reoriented direction", as the bottles are reoriented in that direction by the first conveyor. The preferred embodiments described above have three conveying means in sequence: first rotary conveyor 20, linear conveyor 60 and removal means 80. Without departing from the present invention, the first conveying means could be other than rotary, and the second conveying means could be other than linear, so long as means are provided for engaging each bottle and reorienting it during its travel with the first conveying means so that the open end of each bottle points in the reoriented direction at the downstream end of the first conveying means. Although placement of the pivot member associated with the first conveying means has been described above with reference to the radially inward and radially outward directions of the rotary gripping means which formed the preferred embodiment of the first conveying means, it should be understood that, in the more general sense, the pivot member can best be described as engaging a portion of the leading end of each bottle which is outboard or remote from the areas of contact between the bottle and the gripping means.

Accordingly, the appended claims are intended to cover all such changes and modifications as fall within the spirit and scope of this invention.

What is claimed is:

1. In a bottle orienting apparatus of the type having means for supplying a succession of bottles in random open-end leading and open-end trailing dispositions, mobile gripping means for frictionally engaging the opposite sides of a bottle for movement of said bottle with said gripping means along a path, and discriminating means for inverting each of said bottles which has an open-end leading disposition to open-end trailing disposition, said discriminating means including a generally vertically disposed lever having its upper portion pivotally supported on a bearing positioned above the path of movement of said bottles, said lever having a selective bottle engaging arm integral with said lever at the lower end thereof in the path of movement of said bottles, the improvement comprising:

(a) fluid jet means for directing a stream of fluid at a point of said lever in a direction generally transverse of said lever; and (b) a vane mounted on said lever at said point, whereby said stream of fluid will impinge upon said vane and exert a force on said vane in the direction of flow of said stream, said jet means and said vane being so constructed and arranged that the force exerted by said stream on said vane will tend to move said lever about said bearing and bias said engaging arm in the upstream direction relative to the movement of said bottles.

2. The improvement as claimed in claim 1, wherein said vane is mounted on said lever above said bearing and said fluid jet means is so constructed and arranged to direct said stream of fluid in the downstream direction relative to the movement of said bottles.

3. The improvement as claimed in claim 1, wherein said vane is mounted on said lever below said bearing but above said engaging arm, and said fluid jet means is constructed and arranged to direct said stream of fluid in the upstream direction relative to the movement of said bottles.

4. The improvement as claimed in claim 1, wherein said fluid jet means includes means for selectively controlling the flow rate of said stream of fluid.

* * * * *